United States Patent
Bayne et al.

(10) Patent No.: US 10,198,699 B2
(45) Date of Patent: Feb. 5, 2019

(54) RESERVATION MANAGEMENT SYSTEM AND METHOD

(71) Applicant: LO-Q, PLC, Twyford, Berkshire (GB)

(72) Inventors: Christopher Bayne, Oxford (GB); Christopher Butler, Oxon (GB); Leonard Sim, Berkshire (GB)

(73) Assignee: LO-Q, PLC, Twyford (GB)

( * ) Notice: Subject to any disclaimer, the term of this patent is extended or adjusted under 35 U.S.C. 154(b) by 850 days.

(21) Appl. No.: 14/072,493

(22) Filed: Nov. 5, 2013

(65) Prior Publication Data

US 2014/0067441 A1    Mar. 6, 2014

Related U.S. Application Data

(63) Continuation of application No. 11/529,704, filed on Sep. 28, 2006, now Pat. No. 8,606,605.

(51) Int. Cl.
*G06Q 10/00* (2012.01)
*G06Q 10/02* (2012.01)
*G07C 11/00* (2006.01)

(52) U.S. Cl.
CPC ............. *G06Q 10/02* (2013.01); *G07C 11/00* (2013.01); *G07C 2011/02* (2013.01); *G07C 2011/04* (2013.01)

(58) Field of Classification Search
CPC .......... G06Q 30/0206; G06Q 30/0283; G06Q 10/067; G06Q 10/06
See application file for complete search history.

(56) References Cited

U.S. PATENT DOCUMENTS

| | | | |
|---|---|---|---|
| 4,298,793 A | 11/1981 | Melis et al. | 235/487 |
| 4,398,257 A | 8/1983 | Paganini et al. | 364/550 |
| 4,512,667 A | 4/1985 | Doulton et al. | 368/10 |
| 5,006,983 A | 4/1991 | Wayne et al. | |
| 5,287,269 A | 2/1994 | Dorrough et al. | 364/408 |
| 5,305,197 A | 4/1994 | Axler et al. | 364/401 |
| 5,408,417 A | 4/1995 | Wilder | 364/479 |
| 5,502,806 A | 3/1996 | Mahoney et al. | 395/161 |
| 5,866,890 A | 2/1999 | Neuner | |
| 5,946,444 A | 8/1999 | Evans et al. | 386/46 |
| 5,978,770 A | 11/1999 | Waytena et al. | 705/5 |
| 5,987,420 A | 11/1999 | Maeda et al. | 705/5 |
| 5,987,421 A | 11/1999 | Chuang | 705/7 |

(Continued)

FOREIGN PATENT DOCUMENTS

| | | |
|---|---|---|
| BE | 1006392 | 8/1994 |
| EP | 0 086 199 | 8/1983 |

(Continued)

OTHER PUBLICATIONS

Office Action for corresponding Chinese Application No. 206780036159.7, dated Oct. 12, 2010.

(Continued)

*Primary Examiner* — George Chen

(57) ABSTRACT

A method and system for reserving a time slot to gain access to a resource, such as an attraction, ride, show or event, as may be found in an amusement park. A portable module is used to determine a time when the user is able to access the resource based on reservation requests and throughput, without need for a docking station or continuous communication with a central database of all reservations and queue times.

39 Claims, 2 Drawing Sheets

(56) References Cited

U.S. PATENT DOCUMENTS

| | | | |
|---|---|---|---|
| 5,991,730 A | 11/1999 | Lubin et al. | |
| 6,059,184 A | 5/2000 | Ahlstrom et al. | |
| 6,173,209 B1 | 1/2001 | Laval et al. | 700/91 |
| 6,329,919 B1 | 12/2001 | Boies et al. | 340/573.1 |
| 6,363,351 B1 | 3/2002 | Moro | |
| 6,424,623 B1 | 7/2002 | Borgstahl et al. | |
| 6,529,786 B1 | 3/2003 | Sim | 700/90 |
| 6,570,487 B1 | 5/2003 | Steeves | |
| 6,690,673 B1 | 2/2004 | Jarvis | |
| 6,747,562 B2 | 6/2004 | Giraldin et al. | |
| 6,748,364 B1 | 6/2004 | Waytena et al. | 705/5 |
| 6,778,902 B2 | 8/2004 | Hathiram et al. | |
| 6,813,608 B1 | 11/2004 | Baranowski | |
| 6,829,583 B1 | 12/2004 | Knapp et al. | |
| 6,845,361 B1 | 1/2005 | Dowling | |
| 6,873,260 B2 | 3/2005 | Lancos et al. | |
| 6,889,098 B1 | 5/2005 | Laval et al. | |
| 6,901,261 B2 | 5/2005 | Banatre et al. | |
| 6,962,531 B2 | 11/2005 | Pace et al. | |
| 7,030,765 B2 | 4/2006 | Giraldin et al. | |
| 7,035,815 B1 | 4/2006 | Henson | |
| 7,047,205 B2 | 5/2006 | Hale et al. | |
| 7,050,906 B2 | 5/2006 | Hathiram et al. | |
| 7,069,228 B1 | 6/2006 | Rose et al. | |
| 7,080,025 B2 | 7/2006 | Mifune et al. | |
| 7,103,511 B2 | 9/2006 | Petite | |
| 7,147,149 B2 | 12/2006 | Giraldin et al. | |
| 7,212,983 B2 | 5/2007 | Redmann et al. | |
| 7,222,080 B2 | 5/2007 | Hale et al. | |
| 7,400,932 B2 | 7/2008 | Ackley et al. | |
| 7,505,474 B2 | 3/2009 | Walter | |
| 7,516,148 B2 | 4/2009 | Waytena et al. | |
| 7,532,941 B2 | 5/2009 | Hale et al. | |
| 7,541,926 B2 | 6/2009 | Dugan et al. | |
| 7,555,361 B2 | 6/2009 | Nakamura et al. | |
| 7,629,886 B2 | 12/2009 | Steeves | |
| 8,068,600 B2 | 11/2011 | Collins, Jr. | |
| 8,082,165 B2 | 12/2011 | Natsuyama et al. | |
| 2001/0027481 A1 | 10/2001 | Whyel | |
| 2002/0116235 A1 | 8/2002 | Grimm et al. | |
| 2003/0010822 A1 | 1/2003 | Davies et al. | |
| 2003/0093167 A1 | 5/2003 | Sim | 700/90 |
| 2005/0267787 A1* | 12/2005 | Rose | G06F 17/30864 705/5 |
| 2006/0095434 A1* | 5/2006 | McCullough | G06F 17/30902 |
| 2008/0133283 A1 | 6/2008 | Backer et al. | |
| 2009/0060085 A1 | 3/2009 | Nadler et al. | |
| 2009/0063205 A1* | 3/2009 | Shibasaki | G06Q 10/02 705/5 |

FOREIGN PATENT DOCUMENTS

| | | | |
|---|---|---|---|
| EP | 1076319 | 8/2000 | |
| EP | 1324248 | 12/2002 | |
| EP | 1 308 906 | 5/2003 | |
| EP | 1 420 370 | 5/2004 | |
| EP | 1690220 | 8/2006 | |
| EP | 1690221 | 8/2006 | |
| EP | 1690222 | 8/2006 | |
| EP | 1771828 | 4/2007 | |
| FR | 2 612 669 | 3/1987 | |
| FR | 2 650 095 | 7/1990 | |
| GB | 2 193 359 | 2/1988 | |
| GB | 2 228 123 | 8/1990 | |
| GB | 2373615 | 9/2002 | |
| JP | 01-134565 | 5/1989 | |
| JP | 05-73596 | 3/1993 | |
| JP | 05-300073 | 11/1993 | |
| JP | 6019940 | 1/1994 | |
| JP | 07-234893 | 9/1995 | |
| JP | 8315188 | 11/1996 | |
| JP | 2002/56260 | 2/2002 | 17/60 |
| JP | 2002-163518 | 6/2002 | 17/60 |
| JP | 2003/254777 | 10/2003 | 17/60 |
| JP | 2003-288515 | 10/2003 | 17/60 |
| JP | 2003288515 A1 | 10/2003 | |
| JP | 2004185261 A1 | 7/2004 | |
| JP | 2005/293420 | 10/2005 | 17/60 |
| WO | WO 83/00399 | 2/1983 | |
| WO | WO 90/09002 | 8/1990 | |
| WO | WO0143316 | 6/2001 | |
| WO | WO02095643 | 5/2002 | |
| WO | WO 02/084556 | 10/2002 | |
| WO | WO 03/007247 | 1/2003 | |
| WO | WO 2005/038687 | 4/2005 | |
| WO | WO 2005/038688 | 4/2005 | |
| WO | WO 2005/124699 | 12/2005 | |
| WO | WO 2006/002204 | 1/2006 | |

OTHER PUBLICATIONS

English translation dated Jun. 7, 2011 of the First Office Action for corresponding Mexican Patent Application No. MX/a/2009/003404.

English translation dated Oct. 25, 2011 of the Second Office Action for corresponding Mexican Patent Application No. MX/a/2009/003404.

English translation of the Second Office Action for corresponding Chinese Application No. 200760036159.7, dated Mar. 12, 2012.

International Search Report and Written Opinion for PCT/GB2007/003436 dated Mar. 6, 2008.

UK Patent Office Search Report for GB 9523443.1 dated Feb. 20, 1996.

International Search Report for PCT/GB96/02810 dated Mar. 12, 1997.

English Translation of Japanese Office Action Application No. 9-518684.

U.S. Office Action for U.S. Appl. No. 09/068,701 dated Mar. 28, 2002.

* cited by examiner

RESERVATION MANAGEMENT SYSTEM AND METHOD

RELATED APPLICATION

This application is a continuation of Ser. No. 11/529,704 to Bayne et al., filed on Sep. 28, 2006. Ser. No. 11/529,704, including its drawings, schematics, diagrams and written description, is hereby incorporated in its entirety by reference.

TECHNICAL FIELD

This invention relates to a reservation management apparatus, system and method, for reserving a time slot to gain access to a resource, such as an attraction, ride, show or event, as may be found in an amusement park.

BACKGROUND OF THE INVENTION

In many circumstances, an attraction will have a limited capacity for people to gain access to it at any specific time. For instance, a ride at an amusement park may only have a certain number of seats. It is preferable that access be managed to use the attraction as efficiently as possible. Queues and lines are well known ways of managing this access. However, potential users of the attraction may become bored queuing in a line. Managing access to the resource to use the attraction efficiently, whilst satisfying its potential and actual users, is therefore a particular difficulty.

An existing approach divides the people who wish to access the attraction into two groups. A first group of people is arranged into a physical queue at a first access point for the attraction. Each member of the second group of people is informed of an allotted time slot when they can access the attraction. In order to access the attraction, a member of the second group need only be physically present at a second access point for the attraction, at their allotted time slot. The time slot is selected such that the second group of people can gain access to the attraction without waiting in a long queue at the second access point. The size of the first group of people may be greater than or equal to zero.

One system according to this general approach provides the second group of people with paper tickets. As these tickets set a fixed time for use of the attraction, this system may not easily allow efficient use of the attraction when its throughput changes.

An alternative system according to this general approach is described in U.S. Pat. No. 6,529,786. This system provides the second group of people with handheld units, which are referred to as Q-bots. These are used to make and complete reservations. The Q-bots comprise a short range transmitter for sending a unique identification code, and a receiver. To make a reservation to gain access to a particular attraction, a Q-bot is scanned or docked at a reservation or entry point. The Q-bot makes a record of this reservation and the reservation is communicated to a queue manager. For each reservation, the queue manager determines a time when the person making the reservation should access the attraction, based on the throughput and demand for the attraction.

This time may advantageously be changed by the queue manager when the throughput or demand for the attraction changes. For instance, seats may be added or removed from the attraction, or the attraction may be closed for a short time. The queue manager is coupled to a transmitter. For each reservation, the queue manager transmits a signal to the Q-bot having a record of the reservation to instruct the person carrying the Q-bot to access the attraction at the determined time.

This system is better than that using paper tickets. However, it has a number of problems. Firstly, the person using the Q-bot has to be physically present at a reservation or entry point to make a reservation. Also, this system requires that the signal sent by the transmitter coupled to the queue manager has sufficient range such that all of the Q-bots are capable of receiving this signal. A queue manager may only be able to communicate with a limited number of Q-bots without disrupting the effective management of the system, by losing communication with Q-bots. Hence, more than one queue manager may be required. This system therefore requires a comprehensive fixed infrastructure.

SUMMARY OF THE INVENTION

Against this background and in a first aspect, the present invention provides a portable module for managing access to a resource by a plurality of resource users, comprising: a module input to allow entry to the module of a reservation request indicative of a desire to access the said resource by at least one of the plurality of resource users; a processor arranged upon receipt of the reservation request to identify a time slot during which the said at least one of the plurality of resource users may access the resource, based upon an updatable resource access parameter which is determined upon the basis of: (i) a number of reservation requests for the resource made by other users, having further portable modules; and (ii) an estimated throughput for each user of the resource that has a portable module, the estimated throughput being determined on the basis of a combination of (a) the ratio of the number of potential users of the resource having a portable module to the total number of potential users of the resource, and b) an assessed throughput for the resource; and a module output arranged to indicate the identified time slot to a user of the module.

The portable module may thereby determine a time at which the users of the portable module are able to access the resource, based upon a parameter, which may comprise a single value or item of information, or multiple values or items of information. The parameter is based upon a number of reservation requests and an estimated throughput for the users of portable modules. Advantageously, the portable module is then able to identify an access time without need for a docking station or continuous communication with a central database of all reservations and queue times.

Preferably, the updatable resource access parameter comprises a wait time, which is the time duration until the said at least one of the plurality of resource users may access the resource.

In the preferred embodiment, the portable module further comprises: data storage arranged to store a reservation request received by the module input and to store information representative of the updatable resource access parameter; a transmitter arranged to communicate a representation of a reservation request stored in the data storage; and a receiver arranged to receive information related to the updatable resource access parameter. The transmitter and receiver may use radio, optical, infra-red, or other wireless communication means. Optionally, the transmitter is further arranged to communicate the information representative of the updatable resource access parameter. A synchronous protocol may be used, or optionally an asynchronous protocol may be used.

The present invention also resides in a server module for managing access to a resource by a plurality of resource users, comprising: a receiver for receiving information representative of reservation requests indicative of a desire to access the said resource by at least one of the plurality of resource users; a processor arranged to determine an updatable resource access parameter upon the basis of: (i) the number of received reservation requests for the resource; and (ii) an estimated throughput for each user of the resource that has a portable module, the estimated throughput being determined on the basis of a combination of (a) the ratio of the number of potential users of the resource having a portable module to the total number of potential users of the resource, and (b) an assessed throughput for the resource; and a transmitter arranged to communicate the updatable resource access parameter.

In the preferred embodiment, the transmitter of the server module is further adapted to communicate the estimated throughput for each user of the resource that has a portable module.

The present invention may also be embodied as a system for managing access to a resource by a plurality of resource users, comprising a plurality of portable modules, each portable module comprising a module input to allow entry to the module of a reservation request indicative of a desire to access the said resource by at least one of the plurality of resource users; a transmitter adapted to communicate a representation of a reservation request; a receiver adapted to receive an updatable resource access parameter; a processor arranged upon receipt of the reservation request to identify a time slot during which the said at least one of the plurality of resource users may access the resource, based upon the updatable resource access parameter; and a module output arranged to indicate the identified time slot to a user of the module; the system being arranged to determine the updatable resource access parameter upon the basis of: (i) the number of received reservation requests for the resource; and (ii) an estimated throughput for each user of the resource that has a portable module, the estimated throughput being determined on the basis of a combination of (a) the ratio of the number of potential users of the resource having a portable module to the total number of potential users of the resource, and (b) an assessed throughput for the resource.

In the preferred embodiment, the respective transmitter of each portable module of the system is further arranged to communicate the updatable resource access parameter. The respective receiver of each portable module is preferably further arranged to receive a representation of a reservation request for the resource communicated by another portable module, and the data storage of the portable module is arranged to store the received representation. In this way, the system is optionally configured to allow determination of an aggregate number of reservation requests. The system is optionally further arranged to determine the number of reservation requests for the resource on the basis of a first correction factor.

In the preferred embodiment the system is further arranged to determine the estimated throughput for each user of the resource that has a portable module, on the basis of the product of (a) and (b). Preferably, the system is further arranged to determine the estimated throughput on the basis of the product of (a) and (b) and a proportionality factor. Optionally, the system is further arranged to determine the updatable resource parameter on the basis of: (iii) a second correction factor. The second correction factor may preferably be determined on the basis of at least one of: the time of day; resource location; and resource popularity.

In the preferred embodiment, the system is further arranged to determine the updatable resource parameter on the basis of (i) divided by (ii). Optionally, the updatable resource parameter may also be based upon a proportionality factor.

The system is optionally arranged to determine the ratio of the number of potential users of the resource having a portable module to the total number of potential users of the resource. This may optionally be performed using a lookup table. Advantageously, the ratio may be determined using a model. Optionally, the model may include the total number of portable module users as a factor.

The present invention also comprises a method of managing access to a resource by a plurality of resource users, comprising obtaining, at a portable module, an inputted reservation request indicative of a desire to access the said resource by at least one of the plurality of resource users; identifying a time slot during which the said at least one of the plurality of resource users may access the resource, based upon an updatable resource access parameter which is determined upon the basis of: (i) a number of reservation requests for the resource made by other users, having further portable modules; and (ii) an estimated throughput for each user of the resource that has a portable module, the estimated throughput being determined on the basis of a combination of (a) the ratio of the number of potential users of the resource having a portable module to the total number of potential users of the resource, and (b) an assessed throughput for the resource; and indicating the identified time slot to a user of the respective portable module.

In a second aspect, the present invention is also a portable module for managing access to a resource by a plurality of resource users, comprising a module input to allow entry to the module of a reservation request indicative of a desire to access the said resource by at least one of the plurality of resource users; a receiver arranged to receive an updatable resource access parameter; a processor arranged upon receipt of the reservation request to identify a time slot during which the said at least one of the plurality of resource users may access the resource, based upon the updatable resource access parameter; a transmitter arranged to communicate the updatable resource access parameter; and a module output arranged to indicate the identified time slot to a user of the module.

The present invention is also a method of managing access to a resource by a plurality of resource users, comprising obtaining, at a portable module, an inputted reservation request indicative of a desire to access the said resource by at least one of the plurality of resource users; receiving, at the respective portable module, an updatable resource access parameter; transmitting, at the respective portable module, the updatable resource access parameter; and identifying a time slot during which the said at least one of the plurality of resource users may access the resource, based upon the updatable resource access parameter.

In a third aspect, the present invention is also a portable module comprising a module input, arranged to allow entry of information representative of a number of tokens; a data storage, adapted to store the number of tokens received at the portable module; and a transceiver, arranged to determine a link quality parameter for the portable module, representative of a quality of the link between the portable module and a root node within the network, the transceiver being further arranged to receive information representative of the link quality parameter for a further portable module; wherein the transceiver is further adapted to receive information representative of the number of tokens stored in the further portable module and the data storage is further arranged to add the number of tokens received to the number stored in the data storage, if the quality of the link between the portable module and the root node is better than the quality of the link between the further portable module and the root node, and wherein the transceiver is further adapted to transmit to the further portable module information representative of the number of tokens stored in the data storage, if the quality of the link between the further portable module and the root node is better than the quality of the link between the portable module and the root node.

Advantageously, the network is thereby able to determine a number of tokens, which may be reservation requests, without a significant fixed infrastructure. Instead, the portable modules exchange information from one to another, adding the number of tokens received with each exchange, until the information arrives at the root node. This number of reservation requests can then advantageously be used to identify a time slot for accessing the resource.

In the preferred embodiment, the data storage is further adapted to set the number of tokens stored therein to zero if the quality of the link between the further portable module and the root node is better than the quality of the link between the portable module and the root node. Alternatively, the data storage may be adapted to indicate that these tokens have already been transmitted.

Preferably, the transceiver is further arranged to transmit an acknowledgement message, if the quality of the link between the portable module and the root node is better than the quality of the link between the further portable module and the root node, and is also further arranged to receive an acknowledgement message, if the quality of the link between the further portable module and the root node is better than the quality of the link between the portable module and the root node. The acknowledgement message may be communicated on receipt of the tokens from the further portable module. Optionally, the data storage is adapted to set the number of tokens stored therein to zero after the transceiver has received the acknowledgement message.

The transceiver of the preferred embodiment is further arranged to determine the link quality parameter for the portable module based on the link quality parameter for the further portable module. A hop count of a transmitting further portable module or server module may be received and this may advantageously be used to determine a hop count for the portable module.

The present invention also resides in a network including a root node, comprising a plurality of portable modules as described in this description. The root node of the network may optionally comprise a portable module. In the preferred embodiment, the root node comprises a server module and the server module comprises a receiver, arranged to receive the number of tokens stored in a portable module.

The present invention is also a method for determining the number of tokens received from users of a network, the network comprising a plurality of portable modules and including a root node, the method comprising receiving from a user, at an input to a first portable module, information representative of a number of tokens; storing the number of tokens received at the first portable module in a data storage; determining a link quality parameter, representative of a quality of the link between the first portable module and the root node within the network; receiving at the first portable module the link quality parameter of a second portable module; receiving at the first portable module the number of tokens stored in the second portable module and adding the number of tokens received to those stored in the data storage of the first portable module, if the quality of the link between the first portable module and the root node is better than the quality of the link between the second portable module and the root node; and communicating from the first portable module to the second portable module the number of tokens stored in the first portable module, if the quality of the link between the second portable module and the root node is better than the quality of the link between the first portable module and the root node.

BRIEF DESCRIPTION OF THE DRAWINGS

The invention may be put into practice in various ways, one of which will now be described by way of example only and with reference to the accompanying drawings in which.

SPECIFIC DESCRIPTION OF A PREFERRED EMBODIMENT

Figure 1:
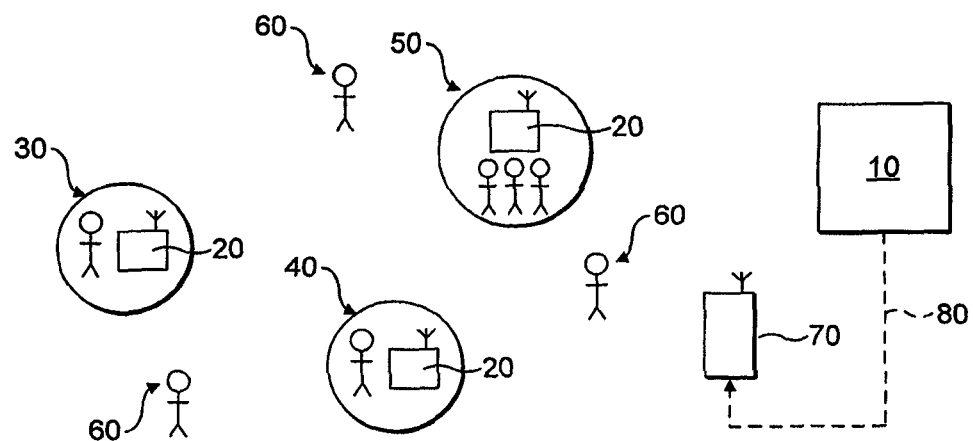
FIG. 1 shows a diagram illustrating a system for managing access to a resource.

Referring first to FIG. 1, a diagram illustrating a system for managing access to an attraction is shown. Although the term attraction is used in this description, an attraction may be understood to be any resource that people may use, having a limited capacity. A number of people, who may be termed resource users, may wish to access resource 10, which is the attraction. The resource may be a ride, show or event in an amusement park or a service counter in a shop or business.

A proportion of the plurality of resource users can obtain a portable module 20. Each portable module may be sold, loaned or leased to one or more resource users. Resource user 30 is a single person having a portable module 20. Resource user 40 is also a single person having a portable module 20. Resource user group 50 comprises three people having, between the three people, a single portable module 20. Some of the resource users 60 may not have a portable module.

The system further comprises a server module 70. The server module is preferably coupled to the resource 10 using a communication link 80 for receiving information from an aspect of the resource.

Figure 2:
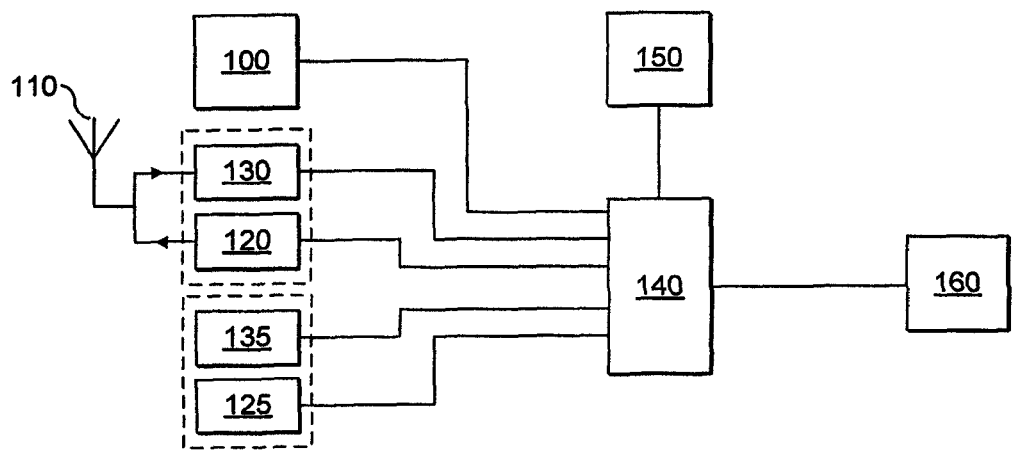
FIG. 2 shows a schematic diagram of a portable module for managing access to a resource according to a first aspect of the present invention to be used in the system of FIG. 1.

FIG. 2 shows a schematic diagram of a portable module according to a first aspect of the present invention. The portable module comprises: a module input 110; a transmitter 120, a receiver 130 and a processor 140.

The portable module 20 has a module input 100. This may be one or more buttons, or a keypad. The module input is used for obtaining a reservation request from a resource user. This is an indication that one of the resource users using the portable module wishes to access the attraction. For instance, if the module input receives three reservation requests for the attraction, this is indicative that three of the people using the portable module wish to access the attraction. The module input is also used for cancelling one or more reservation requests.

Each reservation request is passed from the module input to the processor 140. The processor stores the reservation request in a data storage 150, which in the preferred embodiment is a memory. The number of reservation requests is equal to the number of users wishing to access the resource. The reservation requests are stored as tokens in the data storage 150. Thus, if three reservation requests are received, three tokens are stored in the data storage 150.

In the preferred embodiment, the processor 140 is also coupled to a transmitter 120. An output of the transmitter is coupled to an antenna 110 and is thereby arranged to transmit information about the reservation request. A receiver 130 is also provided with the antenna 110 coupled to its input. Together, the transmitter and receiver comprise a transceiver arrangement. The output of the receiver is coupled to the processor. Advantageously, the transmitter and receiver communicate over at least one communication channel according to a synchronous protocol, as this allows the portable module to use power for the transmitter or receiver only when required.

Once a reservation request has been passed from the module input to the processor, the processor identifies a time slot during which the resource users using the portable module, who have inputted a reservation request, may access the attraction. The processor is coupled to a module output 160, which indicates this time slot to a user of the module.

The processor identifies the time slot upon the basis of an updatable resource access parameter. The updatable resource access parameter is determined through a combination of: (i) a number of reservation requests for the resource made by resource users, having further portable modules; and (ii) an estimated throughput for each user of the resource that has a portable module. According to the preferred embodiment of the system, the updatable resource access parameter is a wait time for accessing the resource, received from server module 70.

The portable module also comprises a second transmitter 125 and a second receiver 135, in a second transceiver arrangement. The second transmitter and second receiver use infra-red communication.

Figure 3:
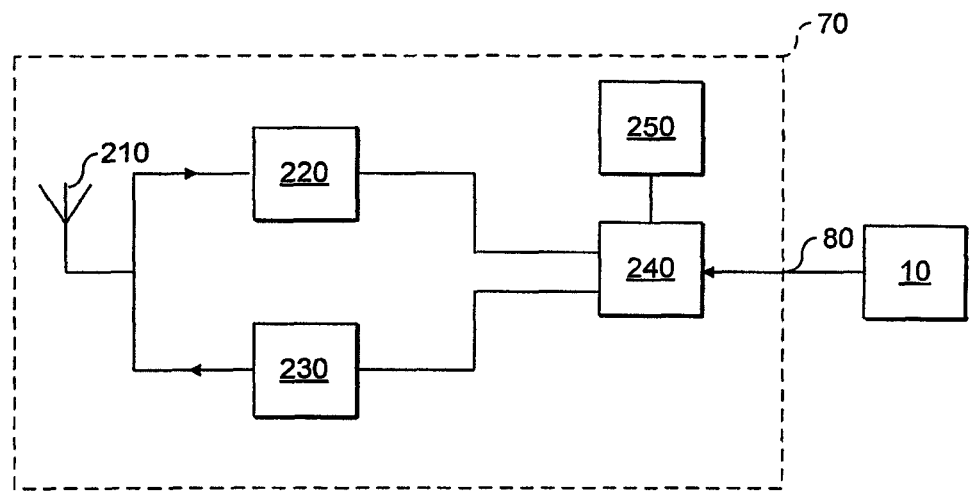
FIG. 3 shows a schematic diagram of a server module for managing access to a resource to be used in the system of FIG. 1, according to a second aspect of the present invention.

FIG. 3 shows a schematic diagram of a server module 70 according to a second aspect of the present invention. The server module comprises an antenna 210 coupled as an input to a receiver 220 and coupled as an output from a transmitter 230. The output of the receiver is coupled as an input to a processor 240. The input to the transmitter is coupled as an output to the processor. A second input to the processor is provided by a server module input 250. A third input to the processor is provided by a communications link 80, which communicates with an aspect of the resource 10.

Figure 4:
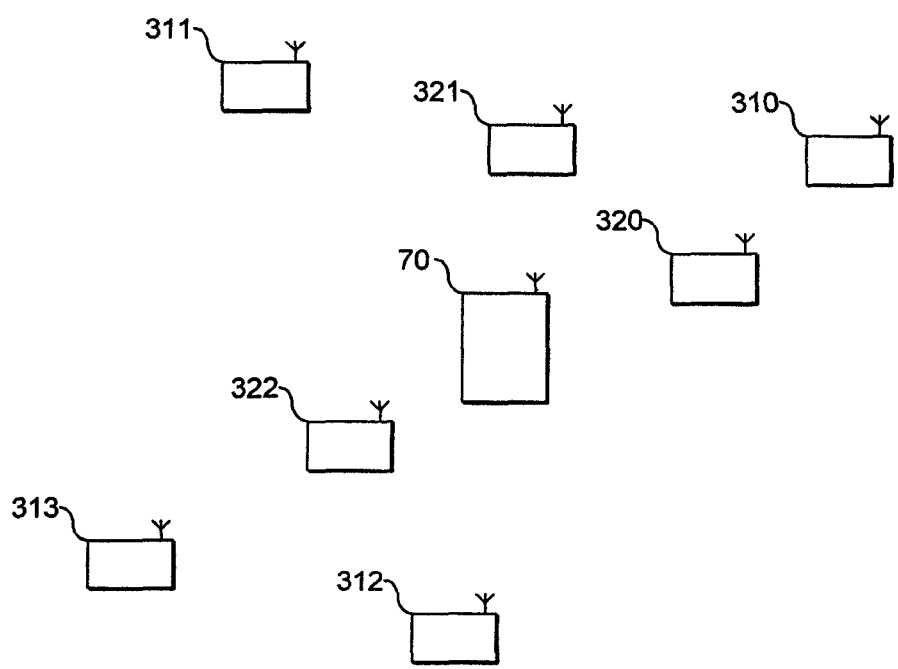
FIG. 4 shows an arrangement of portable modules with respect to a server module according to the system of FIG. 1.

FIG. 4 depicts an arrangement of portable modules according to their location with respect to a server module 70. Over a period of time, a specific portable module, for instance, portable module 310 activates its transmitter on at least one occasion. Similarly over some time, the portable module 310 receives transmissions transmitted by other portable modules, for instance, portable module 320 and portable module 321. To communicate information from a portable module 310 to the server module 70, the portable module 310 can transmit this information to a first further portable module 320. The first further portable module 320 can then relay this to a second further portable module 321 and so on, until the information is communicated to the server module 70. Each portable module thereby determines a 'hop count' to the server module 70. This hop count is a link quality parameter which is the number of communications, or 'hops' needed for a transmission from the portable module to be successfully relayed to the server module 70. In this respect, the server module 70 acts as a root node for the network of portable modules and at least one server module 70. Hence, this hop count indicates the length of time needed for a transmission from the portable module to reach the server module 70. The smaller the hop count of the portable module, the better its link quality. The hop count varies as the location of the portable module is changed.

In the described embodiment, the processor 240 of the server module 70 determines the updatable resource access parameter as a wait time for a user having a portable module and having made a reservation request, according to the following steps.

The server module 70 determines a number of reservation requests for the resource made by resource users. A method of determining the number of reservation requests is now described, using a communication protocol.

A first portable module 310, having received reservation requests through the module input, has at least one reservation request stored in the portable module data storage 150. The first portable module 310 communicates with a second portable module 320 and the two portable modules exchange their hop count.

If the hop count of the second portable module 320 is lower than the hop count of the first portable module 310, then the first portable module transmits the total number of reservation requests stored in its data storage to the second portable module 320. The second portable module 320 sends an acknowledgement message back to the first portable module 310 and adds the number of reservation requests received from the first portable module 310 to the number of reservation requests already stored in its data storage to determine an aggregate number of reservation requests. Upon receipt of the acknowledgement message, the first portable module 310 then deletes the transmitted reservation requests from its data storage.

If the hop count of the first portable module 310 is lower than the hop count of the second portable module 320, then, if the second portable module 320 has any reservation requests stored in its data storage, the second portable module 320 transmits the total number of reservation requests stored in its data storage to the first portable module 310. The first portable module 310 sends an acknowledgement message back to the second portable module 320 and adds the number of reservation requests received from the second portable module 320 to the number of reservation requests already stored in its data storage to determine an aggregate number of reservation requests. Upon receipt of the acknowledgement message, the second portable module 320 then deletes the transmitted reservation requests from its data storage.

This protocol is repeated for each portable module that can communicate with a further portable module. When a portable module 20 is able to communicate directly with the server module 70, the portable module thereby transmits the aggregate number of reservation requests stored in its data storage 150 to the server module 70. The server module 70 thereby determines a number of reservation requests.

If a portable module has no reservation requests stored in its data storage, it does not seek to communicate with other portable modules, since this will only occupy bandwidth. This method advantageously further reduces the volume of communications needed to determine the number of reservation requests without requiring a fixed packet routing tree.

It is not necessary for the aggregate number of reservation requests to be collected from every portable module. This is particularly the case when the network comprises a large number of portable modules. However, the sample size of portable modules from which data is being collected should be a representative cross-section. This allows the system to scale without limit, because when the portable module population is very large, most of the portable modules only need receive data. Then, the number of reservation requests only needs to be collected from a randomly selected cross-section of the total number of portable modules and only these portable modules need to transmit.

There may be a proportion of portable modules that are temporarily out of range for communication with server module 70. For instance, this may occur when there is a distant isolated group of portable modules with no intermediate portable modules to act as stepping-stones for the radio communications. So it is necessary for server module 70 to know how big the sample size of portable modules is from which the aggregate data has been collected. This can be achieved by having the portable modules automatically make a periodic reservation for a non-existent dummy resource. For example, if the portable modules make a reservation for the dummy resource once every 10 minutes, then over any 10-minute period, the number of reservations for the dummy resource will be equal to the currently visible sample size.

Over a long period of time, the server module will accurately determine the total number of reservation requests. However in a shorter period, the number of reservation requests determined may include an error, particularly when the rate at which reservations are made changes while some portable modules are temporarily out of range from communication with the server. To compensate for this, an estimate of the number of reservation requests not received at the server may be made based on recent measurements of the visible sample size. Hence based on this, the server processor 240 may apply a first correction factor to the number of reservation requests.

In determining the number of users who wish to access the attraction in this way, the volume of transmitted information is minimised, since only the change in the number of reservation requests is transmitted.

The server module 70 also determines an estimated throughput for each user of the resource that has a portable module on the basis of a combination of: (a) the ratio of the number of potential users of the resource having a portable module to the total number of potential users of the resource, and (b) an assessed throughput for the resource.

The ratio of the number of potential users of the resource having a portable module to the total number of potential users of the resource 20 may be determined by the server processor 240. The server processor 240 receives the number of people having portable modules. The server processor then calculates the ratio of the number of potential users of the resource having a portable module to the total number of potential users of the resource using this number.

The number of people having portable modules is small when the total number of people able to access the resource, for instance the attendance at the amusement park, is below a threshold value. However, when the total number of people able to access the resource rises above the threshold value, the number of people having portable modules rises approximately proportionately with the increase in the total number of people able to access the resource. An operator or an automatic turnstile system may also monitor the actual total number of people able to access the resource and the proportionality may be evaluated. A correction factor is then used to adjust for any deviation from this proportionality.

The assessed throughput for the resource is provided through the communications link 80. The assessed throughput is determined using external apparatus at the resource or it may be provided as a manual input at the resource by an operator. The assessed throughput may change dramatically during operation. For example, if the attraction is a ride these may include: adding a second carriage to the ride can double its capacity; staff efficiency in loading and unloading the ride may change; or breakdowns or closures for cleaning may reduce throughput to zero.

It is recognised in this invention that an estimated throughput may be preferably determined using the following approach. The server module processor 240 determines an estimated throughput by taking the product of the ratio of the number of potential users of the resource having a portable module to the total number of potential users of the resource and the assessed throughput for the resource. The determined estimated throughput may cause a wait time much longer or shorter than reasonable for the user. A second correction factor may be applied to the estimated throughput to reduce this error. The second correction factor may be based on a number of attributes, which may include: the time of day; resource location; and resource popularity.

The wait time is then determined by a combination of the number of reservation requests for the resource made by resource users and the estimated throughput. The server module maintains a running total of the number of reservation requests for the attraction. This is referred to as an attraction queue length. The server module reduces this attraction queue length at a rate determined by the estimated throughput for each user of the resource that has a portable module. If the queue length ever becomes negative, it is set to zero. The wait time is then determined by dividing the queue length by the estimated throughput, although this may be adjusted by a scaling factor.

The wait time is then transmitted to at least one portable module using the server module transmitter 230. The estimated throughput for each user of the resource that has a portable module, and the time that this information is determined are also communicated to at least one portable module using the server module transmitter 230. This communication may be referred to as a resource status table or park status table. This communication is arranged to occur regularly and with sufficient frequency such that most portable modules are kept up to date as data changes. This frequency is usually within every 5 to 10 minutes.

Having received the resource status table, the portable module may also retransmit the resource status table, or at least the wait time, to other portable modules who cannot receive the data from the server module, according to known networking techniques. The portable module waits for a back-off time before retransmitting the resource status table. In this way, the required range of the transmitter of the server module may advantageously be reduced. As the location of portable modules may change, the resource status table is advantageously efficiently transmitted to many portable modules without the need for a server module with a powerful transmitter or an efficient receiver in the portable module.

A value within the resource status table is the hop count. The server module, acting as a root node, transmits the resource status table with the hop count set to zero. Any portable module that receives the resource status table and determines that the received resource status table contains more recent information than the information that it has stored, increments the received hop count value by one and stores this hop count in its data storage 150. If the portable module retransmits the resource status table, the value of the hop count in the resource status table is that stored in the portable module's data storage 150, rather than that received. In this way, each portable module may determine a value for the hop count.

Once a portable module has transmitted a resource status table, it will listen for reservation request information from other portable modules.

Upon receipt of the wait time and estimated throughput, if a portable module determines that the information received is more recent than the information stored in its respective data storage, the portable module replaces the information stored in its data storage with the more recent information. If a subsequent reservation request is made, the portable module then identifies a time slot during which the said at least one of the plurality of resource users may access the resource based on the most recently received wait time.

If the portable module has identified a time slot, but the processor identified upon receipt of the estimated throughput that the estimated throughput has changed, the portable module may identify an updated time slot during which the resource users may access the resource based on the changed estimated throughput. Hence, the portable module may advantageously adapt the identified time slot to cope with throughput changes.

If a portable module, having previously received values for the wait time and estimated throughput, now goes outside the range of the server module transmissions or retransmissions by other portable modules, upon receipt of a reservation request from a resource user the portable module may still identify a time slot during which the resource users may access the resource, using the previous received wait time. Although this time slot may not be the optimal time slot, since few portable modules will be outside the range of the server module or other portable modules, the overall effect on the attraction utilisation is unlikely to be significant. If the portable module, having identified a time slot, now comes back inside the range of the server module transmissions, the portable module may still receive the estimated throughput measurement. If the estimated throughput has changed, the server module updates the time slot using the changed estimated throughput.

A group of portable modules may become isolated, in that they have not been able to receive or transmit communications to server module 70 for more than a specified time. Any one of the portable modules may spontaneously transmit a resource status table, based on its most recently available data. If a portable module within this isolated group receives the resource status table and determines that its own resource status table is more recent than that received, it transmits its own resource status table to other portable modules.

In order to minimise power consumption, it is preferable that the radio receiver should be running for as little time as possible. To achieve this, all the radio transactions are carried out during a short predetermined periodic time window. This could for instance be for one second every minute. Once per minute, the server module transmits a new resource status table. Portable modules will switch on their receivers slightly before this time, and listen for the resource status table. As previously explained, this will be received either directly from a server module, or forwarded shortly after by one or more intermediate portable modules. Once a resource status table is received, the portable module will forward the information as previously detailed, and wait for a further predetermined period, during which it will accept aggregate reservation request information. The receiver will then shut down until the next resource status table broadcast is expected.

To achieve the synchronisation that this method requires, it is necessary for the portable modules to have an accurate clock. This may be achieved by adding the current time to the transmitted resource status table. Whenever a portable module receives a new resource status table (one that it has not received before), it will adjust its clock according to the current time indicated by the received transmission. Whenever a portable module forwards a resource status table, it will replace the received time in the resource status table by the current time according to its own clock.

The resource status table also comprises a time stamp, indicating the time at which the resource status table was initially transmitted by a server module. The current time is separate from this time stamp, which is always preserved at the value set by the server module, when retransmitted by a portable module.

Whenever a time slot is identified, this is indicated to the person carrying the portable module through the module output. If a time slot is changed, a warning message is also indicated through the module output. All messages are generated by the processor of the portable module. Hence advantageously, continuous communication with the server module is not required.

When, having made at least one reservation request, the time slot for using the attraction arrives, the person or people having made one or more reservation requests proceed to the attraction. The person having a portable module and having made a reservation request, may gain access to the attraction at any time after that identified by the portable module. They may gain access to the attraction in a number of ways. The time slot identified by the portable module hence only comprises a single time. A preferred method of access is now described.

An attendant at the entrance to the attraction may carry a entry module. The entry module comprises a transmitter, a receiver, a processor and a module output. The transmitter and receiver use infra-red communication to communicate with the portable module infra-red transmitter 125 and infra-red receiver 135 carried by the resource user to determine the identified time slot and communicate this to the entry module processor. The entry module processor then uses the entry module output to communicate an appropriate message to the attendant, who may then allow or deny access as appropriate. If access is allowed, the portable module indicates to its user or users that the entry point has been passed. After a preset time the portable module reverts to an idle state.

Although a preferred embodiment has been described above, the skilled person may contemplate alternatives and substitutions to this embodiment. In the portable module, the data storage may alternatively be a fixed data storage device, such as a hard disk, or a removable data storage device, such as a memory card. The transmitter and receiver are preferably adapted for use with radio frequencies, although the skilled person may equally adapt them for use with optical, infrared or other types of transmission. Although the portable module is described herein as a dedicated device, it may alternatively form part of a portable electronic device, such as a portable computer or mobile phone. In this case, some of the functionality of the portable module may be provided by the inherent parts of the portable computer or mobile phone and the remaining functionality may be embodied in additional hardware, software or a combination of hardware and software. In addition, aspects of the transmission protocol may advantageously be adapted to match the requirements of the transmitter and receiver of this hardware, as the skilled person will understand.

The skilled person will appreciate that the module input may be operated according to a number of different configurations. For example, the module input may be pre-programmed with the number of people using the portable module. In this case, further information about the people using the portable module may be provided, for example height or weight information. This information may be used to automatically determine each person's acceptability for using a specific resource. Hence, when a reservation request for an attraction is inputted to the portable module, the number of reservation requests made will correspond to the number of people using the portable module, less the number of people who are unable to use this attraction.

The assessed throughput for the resource may be determined by manual selection of preset throughputs without need for a communication link to the resource 10. This throughput may optionally be adjusted by a throughput modification factor. Although the updatable resource access parameter is described as a wait time, the skilled person will understand that the present invention may be implemented using different updatable resource access parameters, provided that such an updatable resource access parameter is based on a number of reservation requests and an estimated throughput.

Although the term throughput is used, the skilled person will appreciate that this may alternatively be a capacity measurement. The skilled person will also understand that the assessed throughput may be measured, estimated, calculated, or determined through other known techniques.

The server module may transmit other information as well as the wait time and the estimated throughput, including: the assessed throughput; the state of the resource or attraction, for instance, open, closed, temporary shutdown, etc.; the state of the queue at the attraction; and the estimated time for opening of the attraction. This information may form part of the resource status table.

Entry to the attraction may optionally be restricted not only to after an identified time, but also to before a second specified time. In this way, entry to the attraction may be regulated to a time slot of a limited duration.

The skilled person will understand that the portable module may communicate with the entry module using alternatives to infra-red communication, for instance radio communication. In this case, second transmitter 125 and second receiver 135 may be redundant and only the first transceiver may be required.

The skilled person may determine other methods of obtaining access to the attraction. An alternative method to that described provides an automatic turnstile, comprising a transmitter, receiver and a gate. The gate is normally closed. The turnstile interacts with the portable module using its transmitter and receiver, determines whether the resource user is allowed access and opens the gate if this is the case.

The skilled person may also contemplate other methods for determining the number of reservation requests for the resource made by resource users. Such methods may be based upon communication networking protocols well known to the skilled person, such as are used in remote sensor networks or other ad hoc networking technologies.

Although a hop count is used as a link quality parameter in the preferred embodiment, the skilled person will appreciate that other link quality parameters will be used, such as signal strength, signal strengths of other portable modules, or a function thereof. The skilled person will also realise that the portable module may be appropriately adapted depending on the link quality parameter.

In determining the number of reservation requests for the resource made by resource users, the portable module may not necessarily delete the transmitted reservation requests from its data storage, but rather the skilled person will understand that the portable module may alternatively use other means to identify that these reservation requests have been transmitted and to indicate that they should not be transmitted again.

The skilled person may also contemplate alternative embodiments of the system according to the present invention. In a first alternative embodiment, more than one server module may be used. The server modules communicate with each other as well as with portable modules. In such an embodiment, each server module may obtain a proportion of the number of reservation requests for the resource. In a second alternative embodiment, there is no need for a server module. Rather, one of the portable modules may take the place of the server module. This portable module may be provided with the necessary input specifically the ratio of the number of potential users of the resource having a portable module to the total number of potential users of the resource and an assessed throughput for the resource. This information may be provided manually or using a communication link to an aspect of resource 10. Alternatively, it may be estimated using a formula, lookup table, or other such processing means. The portable module taking the place of the server module may determine the number of reservation requests for the resource made by resource users in a similar way to that described above.

In a further alternative embodiment, there may be no need for one of the portable modules to take the place of a server module. Rather, the determination of the wait time may be undertaken by each portable module independently. The portable modules may optionally organise communication between themselves using known ad-hoc communication techniques, together with the communication protocols described herein. In this way, each of the information needed to establish the wait time is determined in a distributed way. Once determined, this information may be passed between the portable modules using known ad hoc processing techniques. This embodiment again reduces the need for a complicated infrastructure.

Although the system has been described for a single resource, the skilled person may adapt the portable module, server module and system in each of the embodiments described for multiple resources. In this case, a wait time is required for each resource. However, it is clear to the skilled person that some parts of the system need not be replicated when multiple resources are available, for instance, only a single portable module is required for a person, or group of people to request access to more than one resource.

Moreover, having identified a time slot for accessing a first resource and received a reservation request for a second resource, the portable module may take account of the identified time slot for the first resource in identifying a time slot for accessing the second resource.

Alternatively, the portable module may optionally comprise a means for determining information regarding its location, for instance a global positioning system receiver, or it may receive information representative of its location, for instance having been triangulated by server modules or other portable modules. If the portable module comprises means for determining its location, it may advantageously identify time slots for different resources based on the wait time and on its location information.

We claim:

1. A portable module for managing access to a resource by a plurality of resource users, comprising:
   a module input to allow entry to the module of a reservation request indicative of a desire to access the resource by at least one of the plurality of resource users;
   a receiver arranged to wirelessly receive a resource access parameter, the resource access parameter being regularly broadcast by a server module and indicating a wait time for accessing the resource;
   a processor arranged upon receipt of the reservation request to identify a time slot, based upon the received resource access parameter;
   a module output arranged to indicate the identified time slot to a user of the portable module;
   a fixed data storage device arranged to store the reservation request;
   wherein the resource access parameter is received at the portable module prior to receipt of the reservation request; and
   wherein the received resource access parameter updates the resource access parameter stored in the portable module if the received resource access parameter is determined to be newer than the stored resource access parameter, such that the identified time slot is based upon the wait time for accessing the resource indicated by the newest received resource access parameter and without continuous communication with the server module.

2. The portable module of claim 1 further comprising:
   said fixed data storage device arranged to store information representative of the resource access parameter;
   a transmitter arranged to communicate a representation of a reservation request stored in the data storage; and
   a receiver arranged to receive information related to the resource access parameter.

3. The portable module of claim 2, wherein the transmitter is further arranged to communicate the information representative of the resource access parameter.

4. The portable module of claim 2, wherein the receiver is further adapted to receive information representative of an estimated throughput.

5. The portable module of claim 2, wherein the receiver is further adapted to receive information representative of an assessed throughput for the resource.

6. The portable module of claim 2, wherein the transmitter and receiver are configured to use a synchronous communication protocol.

7. The portable module of claim 1, wherein the module output comprises a display device configured to indicate the identified time slot to the user of the module.

8. A server module for managing access to a resource by a plurality of resource users, comprising:
   a receiver arranged to wirelessly receive a resource access parameter, the resource access parameter being regularly broadcast by a server module and indicating a wait time for accessing the resource, said receiver for receiving information representative of reservation requests indicative of a desire to access the said resource by at least one of the plurality of resource users;
   a processor arranged to identify a time slot based upon the received resource access parameter;
   wherein the resource access parameter is received at the server module prior to receipt of the reservation requests; and
   a fixed data storage device arranged to store the reservation requests;
   wherein the received resource access parameter updates the resource access parameter stored in the server module if the received resource access parameter is determined to be newer than the stored resource access parameter, such that the identified time slot is based upon the wait time for accessing the resource indicated by the newest received resource access parameter and without continuous communication with the server module.

9. The server module of claim 8, further comprising a transmitter arranged to communicate the resource access parameter, wherein the transmitter is further adapted to communicate an estimated throughput for each user of the resource that has a portable module.

10. A system for managing access to a resource by a plurality of resource users, comprising a plurality of portable modules, each portable module comprising:
    a module input to allow entry to the module of a reservation request indicative of a desire to access the said resource by at least one of the plurality of resource users;
    a receiver adapted to wirelessly receive a resource access parameter, the resource access parameter being regularly broadcast by a server module and indicating a wait time for accessing the resource;
    a processor arranged upon receipt of the reservation request to identify a time slot, based upon the received resource access parameter; and
    a module output arranged to indicate the identified time slot to a user of the portable module;
    a fixed data storage device arranged to store the reservation request;
    wherein the resource access parameter is received at the portable module prior to receipt of the reservation request, and the received resource access parameter updates the resource access parameter stored in the portable module if the received resource access parameter is determined to be newer than the stored resource access parameter, such that the identified time slot is based upon the wait time for accessing the resource indicated by the newest received resource access parameter and without continuous communication with the server module.

11. The system of claim 10 wherein a respective transmitter of each portable module is adapted to communicate a representation of a reservation request and is further arranged to communicate the resource access parameter.

12. The system of claim 11, wherein the respective receiver of each portable module is further arranged to receive a representation of a reservation request for the resource communicated by another portable module, and the data storage of the portable module is arranged to store the received representation.

13. The system of claim 12, wherein the processor of a portable module is further configured to determine an aggregate number of reservation requests based on a combination of the reservation requests stored in the data storage of the portable module, and wherein the transmitter of the portable module is further arranged to communicate the aggregate number of reservation requests.

14. The system of claim 10, wherein the system is further arranged to determine an estimated throughput for each user of the resource that has a portable module, on the basis of the product of (a) and (b).

15. The system of claim 14, wherein the system is further arranged to determine the estimated throughput on the basis of the product of (a) and (b) and a proportionality factor.

16. The system of claim 15, wherein the system is further arranged to determine the updatable resource parameter on the basis of:
(iii) a second correction factor.

17. The system of claim 16, wherein the system is further arranged to determine the second correction factor on the basis of at least one of: the time of day; resource location; and resource popularity.

18. The system of claim 10, wherein the system is further arranged to determine the updatable resource parameter on the basis of (i) divided by (ii).

19. The system of claim 18, wherein the system is further arranged to determine the updatable resource parameter based upon a proportionality factor.

20. The system of claim 10, wherein the system is further arranged to determine the ratio of the number of potential users of the resource having a portable module to the total number of potential users of the resource.

21. The system of claim 20, wherein the system further comprises a lookup table, and the system is further adapted to determine the ratio of the number of potential users of the resource having a portable module to the total number of potential users of the resource using the lookup table.

22. The system of claim 10, further comprising a server module, the server module comprising:
a receiver for receiving information representative of reservation requests indicative of a desire to access the said resource by at least one of the plurality of resource users; and
a processor arranged to determine the resource access parameter.

23. The system of claim 22, wherein the processor of the server module is further arranged to determine the number of reservation requests for the resource.

24. The system of claim 10, wherein the system is further arranged to determine the number of reservation requests for the resource on the basis of a first correction factor.

25. The system of claim 10, wherein the system is further arranged to determine an assessed throughput for the resource by measuring a throughput for the resource for all the users of the resource.

26. A method of managing access to a resource by a plurality of resource users, comprising:
obtaining, at a portable module, an inputted reservation request indicative of a desire to access the said resource by at least one of the plurality of resource users;
wirelessly receiving a resource access parameter, the resource access parameter being regularly broadcast by a server module and indicating a wait time for accessing the resource;
identifying a time slot, based upon the received resource access parameter;
indicating the identified time slot to a user of the respective portable module;
arranging a fixed data storage device to store the reservation request;
wherein the resource access parameter is received at the portable module prior to receipt of the reservation request, and the received resource access parameter updates the resource access parameter stored in the portable module if the received resource access parameter is determined to be newer than the stored resource access parameter, such that the identified time slot is based upon the wait time for accessing the resource indicated by the newest received resource access parameter and without continuous communication with the server module.

27. The method of claim 26, further comprising:
storing, at a respective portable module, the inputted reservation request;
receiving, at the respective portable module, information representative of at least one reservation request for the resource from another portable module;
determining, at the respective portable module, the aggregate number of reservation requests for the resource by combining the inputted reservation request and the received information representative of the at least one reservation request;
transmitting, at the respective portable module, information representative of the aggregate number of reservation requests.

28. The method of claim 27, further comprising:
repeating the steps of storing, receiving, determining and transmitting at different respective portable modules.

29. The method of claim 26, further comprising:
receiving, at a respective portable module, the resource access parameter; and
storing, at the respective portable module, the resource access parameter.

30. The method of claim 26, further comprising:
transmitting the resource access parameter from a respective portable module to another portable module.

31. The method of claim 26, further comprising:
repeating the step of obtaining on a portable electronic device.

32. The method of claim 26, further comprising:
repeating the step of obtaining on a computer readable medium having a computer program.

33. A portable module for managing access to a resource by a plurality of resource users, comprising:
a module input to allow entry to the module of a reservation request indicative of a desire to access the said resource by at least one of the plurality of resource users;
a receiver arranged to wirelessly receive a resource access parameter, the resource access parameter being regularly broadcast by a server module and indicating a wait time for accessing the resource;
a processor arranged upon receipt of the reservation request to identify a time slot, based upon the received resource access parameter;
a module output arranged to indicate the identified time slot to a user of the portable module;
a fixed data storage device arranged to store the reservation request;
wherein the resource access parameter is received at the portable module prior to receipt of the reservation request; and
wherein the received resource access parameter updates the resource access parameter stored in the portable module if the received resource access parameter is determined to be newer than the stored resource access parameter, such that the identified time slot is based upon the wait time for accessing the resource indicated by the newest received resource access parameter and without continuous communication with the server module.

34. A method of managing access to a resource by a plurality of resource users, comprising:
- obtaining, at a portable module, an inputted reservation request indicative of a desire to access the said resource by at least one of the plurality of resource users;
- wirelessly receiving, at the respective portable module, a resource access parameter, the resource access parameter being regularly broadcast by a server module and indicating a wait time for accessing the resource; and
- identifying a time slot based upon the received resource access parameter;
- arranging a fixed data storage device to store the reservation request;
- wherein the resource access parameter is received at the portable module prior to receipt of the reservation request, and the received resource access parameter updates the resource access parameter stored in the portable module if the received resource access parameter is determined to be newer than the stored resource access parameter, such that the identified time slot is based upon the wait time for accessing the resource indicated by the newest received resource access parameter and without continuous communication with the server module.

35. A portable electronic device configured to manage a reservation for a user to access one or more resources, the portable electronic device comprising:
- a wireless receiver, configured to receive over a mobile communications network an resource access parameter from a server, the resource access parameter providing an indication of a wait time until the user can access each of the one or more resources;
- a device input, configured to receive a reservation request from a user of the portable electronic device for a selected resource from the one or more resources;
- a processor, configured to determine a reservation time when the user can access the selected resource using the received resource access parameter, in response to receipt of the reservation request; and
- a device output, configured to inform the user of the determined reservation time, such that the user may gain access to the selected resource at any time after the determined reservation time without the portable electronic device notifying the determined reservation time to the server;
- wherein the resource access parameter is received at the portable electronic device prior to receipt of the reservation request; and
- wherein the received resource access parameter updates the resource access parameter stored in the portable electronic device if the received resource access parameter is determined to be newer than the stored resource access parameter, such that the determined reservation time is based upon the wait time until the user can access each of the one or more resources indicated by the newest received resource access parameter and without continuous communication with the server.

36. The portable electronic device of claim 35, wherein the portable electronic device comprises a mobile telephone such that the receiver, device input, processor and device output are components of the mobile telephone.

37. The portable electronic device of claim 35, wherein the portable electronic device comprises a mobile telephone and the receiver uses a communications protocol of a mobile telephone network to receive the updatable resource access parameter from the server.

38. The portable electronic device of claim 35, wherein the device output comprises a display, configured to display the reservation time to the user.

39. The portable electronic device of claim 35, wherein the processor is further configured to control the receiver, device input and device output to carry out their respective functions.

* * * * *